US010711495B2

(12) United States Patent
Tuthill et al.

(10) Patent No.: US 10,711,495 B2
(45) Date of Patent: Jul. 14, 2020

(54) LATCH FOR AN ANIMAL HOUSE (71) Applicant: Hebe Studio Ltd., Oxfordshire (GB)

(72) Inventors: James Tuthill, Oxford (GB); Johannes Paul, London (GB); Simon Nicholls, Northamptonshire (GB); William Windham, Banbury (GB)

(73) Assignee: HEBE STUDIO LIMITED, Oxfordshire (GB)

(*) Notice: Subject to any disclaimer, the term of this patent is extended or adjusted under 35 U.S.C. 154(b) by 372 days.

(21) Appl. No.: 15/678,257

(22) Filed: Aug. 16, 2017

(65) Prior Publication Data
US 2018/0051499 A1 Feb. 22, 2018

(30) Foreign Application Priority Data

Aug. 17, 2016 (GB) .................................. 1614096.4

(51) Int. Cl.
E05C 19/02 (2006.01)
A01K 31/02 (2006.01)
A01M 29/30 (2011.01)
E05C 3/00 (2006.01)
E05C 3/12 (2006.01)

(52) U.S. Cl.
CPC ............ *E05C 19/024* (2013.01); *A01K 31/02* (2013.01); *A01M 29/30* (2013.01); *E05C 3/006* (2013.01); *E05C 3/12* (2013.01)

(58) Field of Classification Search
CPC ........ E05C 19/024; E05C 19/02; E05C 19/06; E05C 19/007; E05C 3/06; E05C 3/008; E05C 3/12; A01K 31/02; A01M 29/30; A01M 29/32; E05B 63/0065; E05B 65/0014; Y10T 292/0934

USPC .......................................................... 292/91
See application file for complete search history.

(56) References Cited

U.S. PATENT DOCUMENTS

| 4,378,948 A * | 4/1983 | Chrones .............. E05B 65/0014 292/19 |
| 4,416,477 A * | 11/1983 | Bialobrzeski ....... E05B 65/0014 292/19 |
| 5,711,554 A * | 1/1998 | Brown ................ E05B 65/0014 292/17 |
| 6,942,257 B2 * | 9/2005 | Wong .................. E05B 65/0014 292/128 |

FOREIGN PATENT DOCUMENTS

WO 84/02946 8/1984

OTHER PUBLICATIONS

U.K. Search Report, Intellectual Property Office, dated Jan. 26, 2017, 3 pages.

* cited by examiner

*Primary Examiner* — Nathan Cumar
(74) *Attorney, Agent, or Firm* — Taft Stettinius & Hollister LLP; Stephen F. Rost (57) ABSTRACT A latch for an animal house includes a first arm, a second arm, and a body. The first arm and the second arm are connected to each other at one end by the body, and the first arm and the second arm are each flexibly supported at the body. Each arm is independently able to flex with respect to the body. The latch has a flat spring which is adapted to restore the latch to a rest condition in which the arms are aligned with each other.

20 Claims, 6 Drawing Sheets

LATCH FOR AN ANIMAL HOUSE

RELATED APPLICATION

This application claims the benefit of United Kingdom Patent Application Ser. No. 1614096.4, filed on Aug. 17, 2016, the disclosure of which is hereby expressly incorporated by reference in its entirety.

FIELD

The present disclosure relates to latch for an animal house, particularly, though not exclusively, for use as a fox-proof latch for a hen house.

BACKGROUND

It is known to use hen houses to keep chickens and other poultry. These hen houses serve to shelter chickens at night. They provide protection for both the chickens and their eggs from predators such as foxes.

So that the hen houses may be cleaned and the eggs may be retrieved, some known hen houses are provided with removable parts, such as doors and tray units.

These doors and tray units could provide access points for a predator such as a fox. In order to prevent such unwanted access, latching means are provided. The latching means must be designed such that it is not so complicated as to hinder the person removing the removable part.

The present disclosure seeks to provide an improved latch for an animal house.

SUMMARY

In accordance with a presently preferred embodiment of the present disclosure, there is provided a latch for an animal house, the latch comprising: a body; a first arm extending from the body; and a second arm extending from the body; wherein the first arm and the second arm are each independently able to flex with respect to the body, the first arm and the second arm defining a fixed end proximate to the body, and a free end distal to the body, wherein a wall is provided on the first and/or second arm, the wall dividing the first and/or second arms, and wherein the latch comprises a restoring resilient bias, the restoring resilient bias being configured to restore the latch to a rest condition in which the first and second arms are substantially aligned with each other. For a latch fitted to an animal house removable part, in the rest condition the latch ensures the removable part is closed or locked to the animal house.

The independently flexible arms ensure that in order to move the latch from a rest condition; and hence open the removable part to which the latch is attached, both arms must be actuated. This is not possible for a predator such as a fox, using only its paw or its jaw. In particular, the wall of the first and/or second arm prevents a predator such as a fox, from being able to fit its jaw around the latch. A predator such as a fox is also not able to reach each side of the wall with its paw. Instead the latch can only be manipulated into an actuated condition, so as to allow opening or unlocking of the removable part from the animal house, when pressure is applied to both the first arm and the second arm simultaneously. This simultaneous pressure may be applied simply by light index and middle finger pressure. This arrangement prevents an animal such as a fox from being able to simultaneously apply pressure to both the first arm and the second arm simultaneously.

The restoring resilient bias may be a flat spring. A flexing region of the flat spring may be defined between the body and the first arm and the body and the second arm.

A flat spring allows a predetermined amount of flex in the first and second arm for a given amount of force, thus light finger pressure may be used to open the latch. The flat spring is in an un-stressed state in the rest condition. When a first and/or second arm is moved away from the rest condition, elastic properties of the flat spring provide a storage of elastic potential energy. When the first and/or second arm are released, the first and/or second arms are restored back to the rest condition by the stored elastic potential energy of the flat spring. The flat spring provides a reliable flexing arrangement. Furthermore, such a flexing arrangement may be manufactured at low cost.

The first arm and the second arm may each be adapted to be flexible only in a first and a second direction, the second direction being opposite to the first direction.

The latch may be a single unitary piece. The latch may thus be assembled at low cost. The first and second arms may extend so as to define a slot therebetween. This may prevent sliding or clashing of the two arms against each other.

The wall of the first arm and/or the second arm may define a tab. In use, the tab may be used as a latch to obstruct removal of the removable part. Each of the first and the second arms may comprise a respective wall.

The tab or tabs may be located at the free end. The first and second arms may extend in an axial direction and the tabs may extend in a lateral direction. Particularly, the arms together may extend in a first plane and the tabs may extend in a second plane, the first, plane being orthogonal to the second plane.

This configuration improves the reliability of the latch. In this configuration, each arm must be moved away from a rest condition by the maximum dimension of the tabs. This reduces the possibility the latch being opened inadvertently.

Each tab may be substantially wedge-shaped such that it has a wide end and a narrow end, and the wide end may be proximate the free end of the latch. Each tab may have a first sloped section proximate the narrow end, and a second sloped section proximate the wide end, the first sloped section having a steeper gradient relative to the arm than the second sloped section.

The sloped section or sections allow the latch to be closed more easily, as the sloped section or sections can act as a guide.

The slot may have a width, and the width may be between 0.5 mm and 10 mm. Particularly, the width of the slot may be between 1 mm and 3 mm. The tab and/or tabs may each have a tab rim, the rim of each tab extending towards the other respective tab. The tabs may be located apart by a distance D, the distance D being larger than the width W of the slot, the rims of the tabs being a distance R apart, the distance R being the same as the width W of the slot.

The latch may comprise polymeric material. For example, the latch may comprise high density poly(ethylene), "HDPE". Alternatively, the latch may comprise a metal. Preferably, the metal is a non-brittle metal.

The latch may have rounded edges. The latch may have a rim at the free end of the latch, the rim extending in a lateral direction. These features have the advantage of making the latch more ergonomic.

According to a second aspect of the disclosure, there may be provided a tray unit comprising a latch as described above.

According to a third aspect of the disclosure, there may be provided an animal house comprising a latch as described above, wherein the animal house comprises a panel, the panel defining an aperture bounded at an edge thereof by a first portion of the panel, wherein the latch is arranged relative to the panel such that the first and the second arms are aligned with the aperture and the wall extends at least partially across the aperture and the first portion of the panel.

The relative positioning of the latch and the panel defining the aperture means that the latch may not be drawn through the aperture, without applying pressure to the first and/or second arms so that the wall no longer extends across the aperture and first portion of the panel, but extends only across the aperture.

In this configuration, the first portion of the panel may cover part of the wall of the latch such that when viewed from the outside of the animal house, part of the wall of the latch may not be visible or directly accessible. In this arrangement, only the arms of the latch and part of the wall of the latch may be accessed. This arrangement prevents a predator such as a fox from being able to access an underside of the latch and remove the latch from the animal house.

The animal house may further comprise a tray unit, wherein the latch is attached to the tray unit at the latch fixed end, the tray unit being aligned with the aperture. The tray unit of the animal house may define a groove, the groove being configured to receive the latch when the latch is flexed towards the tray unit.

A dimension defined by the tray unit and the latch, when the latch is in a rest condition, may be larger than a dimension defined by the gap of the animal house. This configuration provides a robust arrangement, in which the tray unit cannot be inadvertently opened without full actuation of the latch.

The latch and the tray unit may be configured such that when the flexible arms of the latch are both flexed towards the tray unit, a dimension defined by the latch and the tray unit is smaller than a dimension defined by the gap of the animal house. In this configuration, when the latch is flexed, the tray unit may be opened by sliding the tray unit through the aperture defined by the panel.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

DETAILED DESCRIPTION

The latch 1 (see FIGS. 1 to 4) has a first arm 10, a second arm 20 and a body 30. The latch 1 is a single unitary piece of plastic. The latch 1 has a longitudinal axis A. The first arm 10 is a mirror image of the second arm 20. Given that the first arm 10 and the second arm 20 have the same features, and that the first arm 10 is a mirror image of the second arm 20, only one arm will be described in detail. Reference numerals for features which correspond on each arm are the same, but preceded by the number "1" for the first arm and the number "2" for the second arm.

The first arm 10 is substantially elongate, planar, and has a fixed end 11 and a free end 13. The first arm 10 also has an outer side 15 and an inner side 17. The first arm 10 has an arm rim 16 proximate the free end 13. The first arm 10 has a tab 12. The tab 12 is located proximate the free end 13, and located along substantially half of the inner side 17 of the arm. The tab 12 extends out of the plane defined by the arm 10.

The tab 12 of the arm 10 is substantially wedge-shaped and has a wide end and a narrow end. The wide end is proximate the free end 13 of the arm 10 and the narrow end is proximate the fixed end 11 of the arm 10. The wide end of the tab 12 is aligned with the free end 13 of the arm 10. The tab 12 has a first sloped section 18 proximate the narrow end, a second sloped section 19 proximate the wide end, the first sloped section 18 having a steeper gradient relative to the axis A than the second sloped section 19 (best seen in FIG. 3). The tab 12 has a tab rim 14. The tab rim 14 extends around the periphery of the portion of the tab 12 that is out of the plane defined by the arm 10.

The body 30 is substantially planar and rectangular. The body 30 has a free side 33, a fixed side 31 and two outer sides, 35, 39. The body 30 also has two curved corners. The two curved corners are respectively each between the first outer side 35 and the free side 33, and the free side 33 and the second outer side 39. The body 30 has a first series of ribs 32, and a second series of ribs 34. The body 30 also has an aperture 36. The aperture 36 is aligned with the axis A. The first series of ribs 32 and the second series of ribs 34 are each located on opposite sides of the aperture 36. The first series of ribs 32 and the second series of ribs 34 are each aligned with the sides of the body 30. In the latch 1 shown in FIG. 1, each series of ribs has ten individual ribs. The extent to which the ribs extend away from the body 30 can be seen in FIG. 3.

Figure 1:
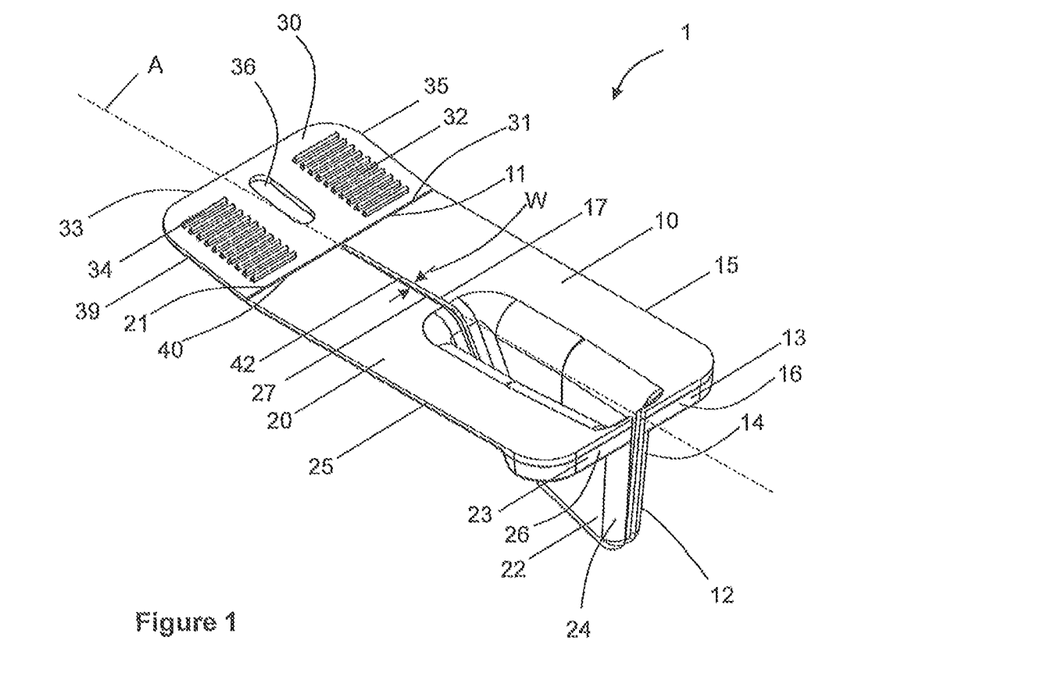
FIG. 1 is a perspective view of a latch in a rest condition.
Figure 2:
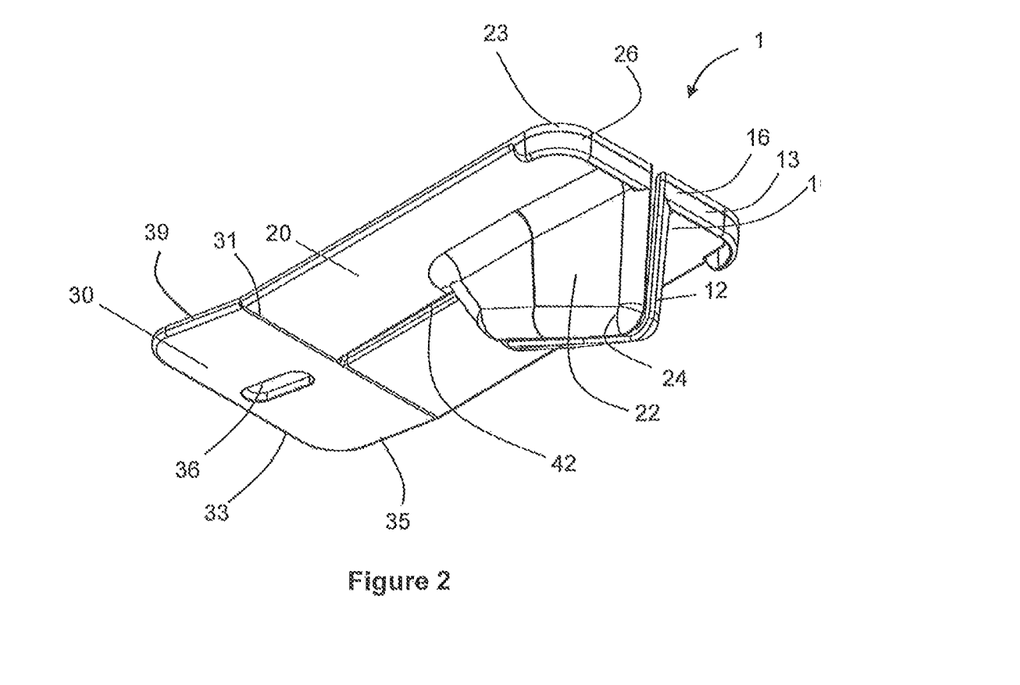
FIG. 2 is a further perspective view of the latch of FIG. 1.
Figure 3:
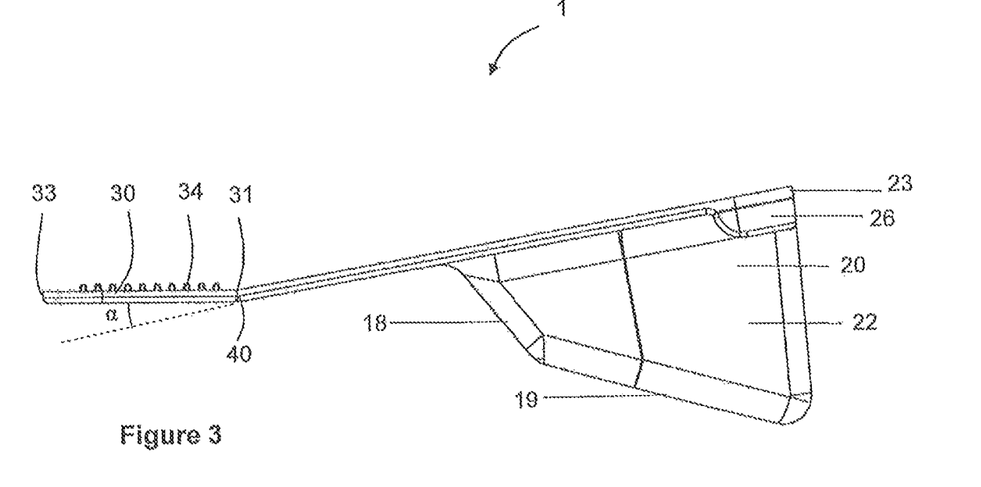
FIG. 3 is a side view of the latch of FIG. 1.

The first arm 10 is attached to the body 30 along a line 40. The second arm 20 is also attached to the body 30 along the line 40. The first arm 10 is attached to the body 30 at a first side of the axis A. The second arm 20 is attached to the body 30 at a second side of the axis A. The arms 10, 20 are attached to the body such that the outer side 15 of the first arm 10 is aligned with the first outer side 35 of the body 30, and the outer side 25 of the second arm 20 is aligned with the second outer side 39 of the body 30. As shown in FIG. 3, the body 30 is angled relative to the plane defined by the arms 10, 20, at an angle α.

Figure 4:
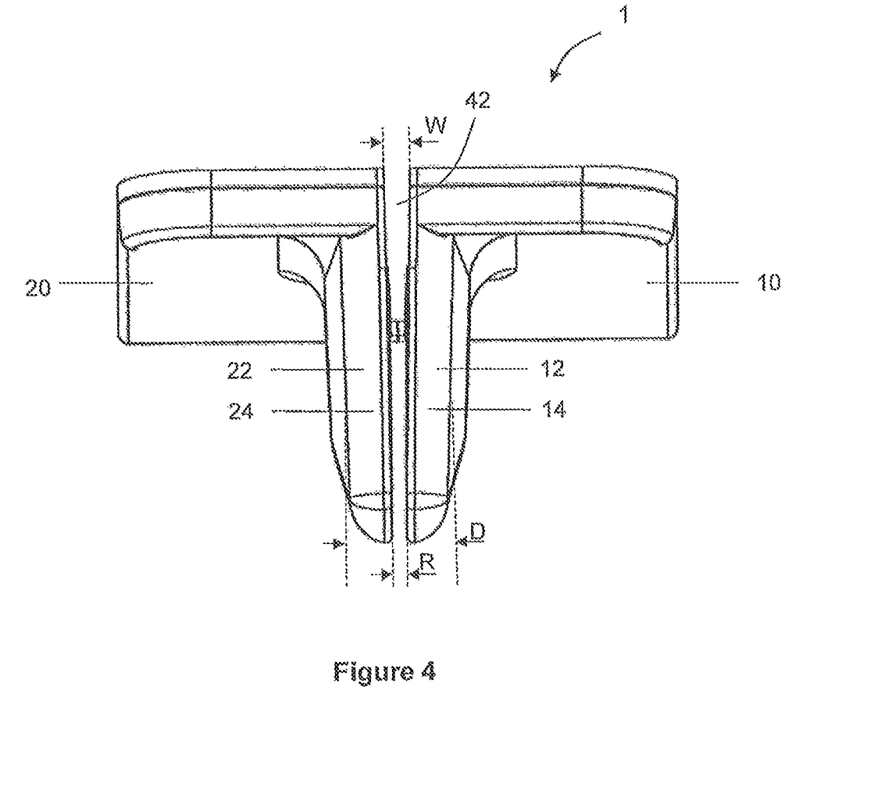
FIG. 4 is a back view of the latch of FIG. 1.

The arms 10, 20, define a slot 42 therebetween. The slot 42 has a width W. With reference to FIG. 4, the tabs 12, 22, are separated by a distance D. The rims 14, 24, are separated by a distance R. The distance D is greater than the distance R. The width W of the slot is the same as the distance R.

The latch 1 is adapted so that each arm 10, 20, is independently flexible about the body 30. The latch further comprises a restoring resilient bias configured to restore the latch to a rest condition in which the first and second arms are substantially aligned with each other. In some embodiments, the restoring resilient bias may be a separate component (i.e., a flat spring defined between the body and the arms or a spring or tensioning mechanism of any suitable type positioned above or below the arms to bias the arms toward the rest condition). In some embodiments, the restoring resilient bias may be define in the body and/or the arms. In some embodiments, the latch itself is the restoring resilient bias, such that the latch is formed of a resilient material and biased toward the rest condition. Flexing of one of the arms 10, 20, about the line 40 does not cause flexing of the other arm without an independent input. This can be seen in FIG. 5.

Figure 5:
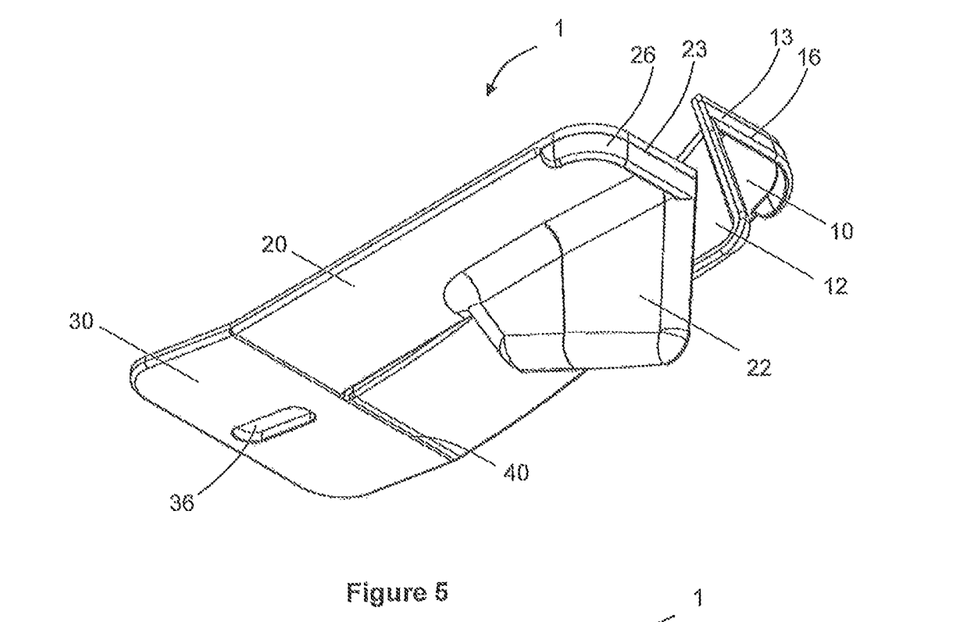
FIG. 5 is a perspective view of the latch, in a partially opened configuration.

As shown in FIG. 5, each arm is effectively pivotable about the body 30 along the line 40, such that the free ends 13, 23, of each arm 10, 20 is movable about the line 40. The line 40 restricts movement in various directions such that each arm 10, 20, is only be flexible in a first direction, for example up and out of the plane, and a second direction, for example down and out of the plane.

Figure 6:
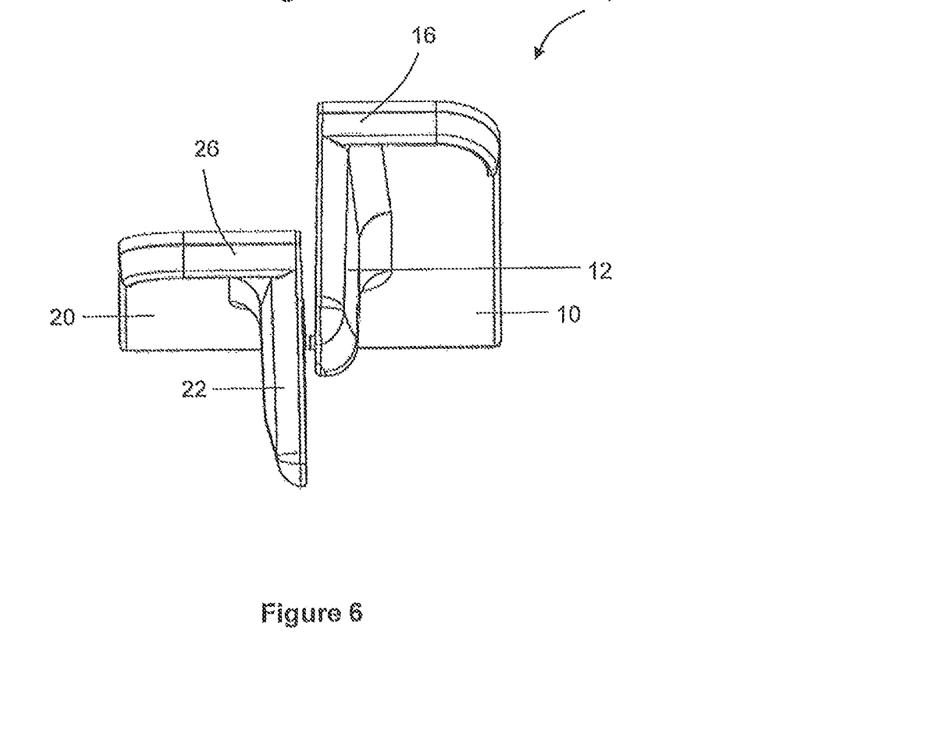
FIG. 6 is a back view of the latch of FIG. 5.

FIG. 6 shows the second arm 20 in the rest condition and the first arm 10 in an actuated condition, moved in the first direction, out of the plane defined by the latch 1.

Figure 7:
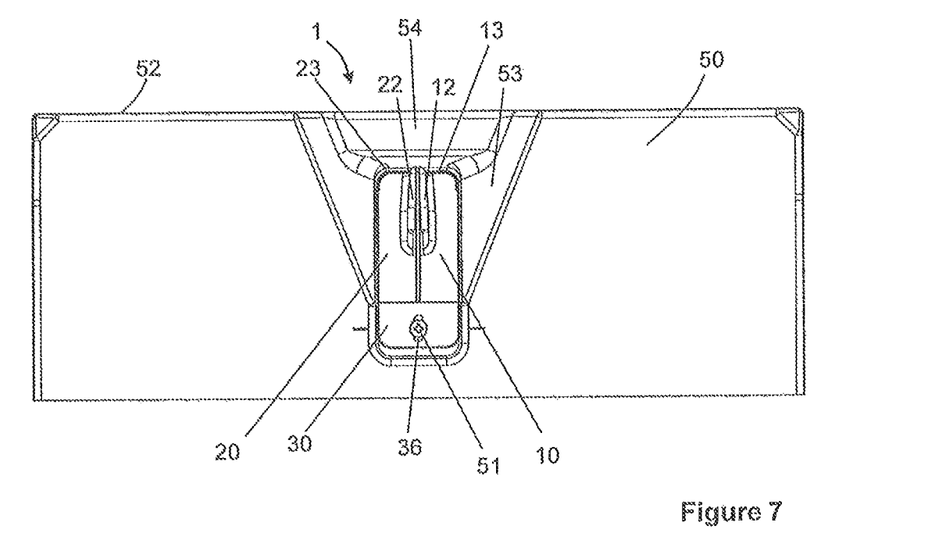
FIG. 7 is a rear view of a tray unit according to the second aspect of the disclosure.
Figure 8:
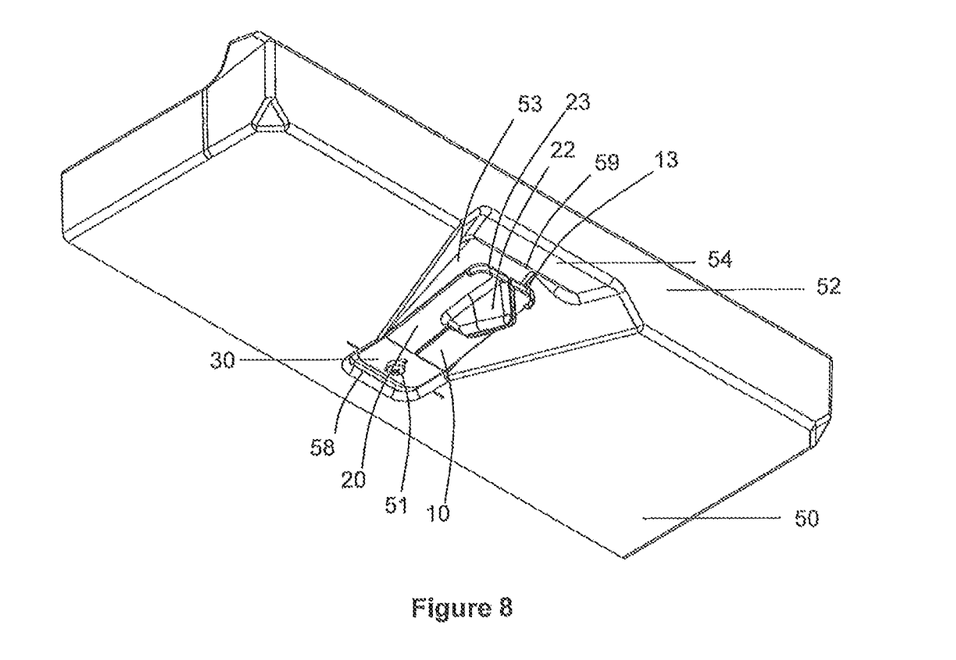
FIG. 8 is a perspective view of the tray unit of FIG. 7.

As shown by FIGS. 7 and 8, the latch 1 can be attached to a tray unit 50.

The tray unit 50 is substantially planar and has front edge 52, a wedge-shaped groove 53 and a lip 54.

The groove 53 has a first end 58 and a second end 59. The groove 53 defines a shallow space at the first end 58 and a deep space at the second end 59. The groove 53 also defines a narrow space at the first end 58 and a wide space at the second end 59.

The second end 59 of the groove 53 is proximate the front edge 52. The lip 54 is disposed between the groove 53 and the front edge 52.

The latch 1 is attached to the tray unit 50 by a fastener 51 through the aperture 36 of the latch 1, at the first end 58 of the groove 53. The fastener 51 is a screw. The screw is smaller than the aperture 36 of the latch 1 in at least one direction, to accommodate any size discrepancy due to manufacturing tolerances.

The latch 1 is attached to the tray unit 50 such that each free end 13, 23 of each respective arm 10, 20 is movable, such that it can be moved towards the tray unit 50, or away from the tray unit 50.

Figure 9:
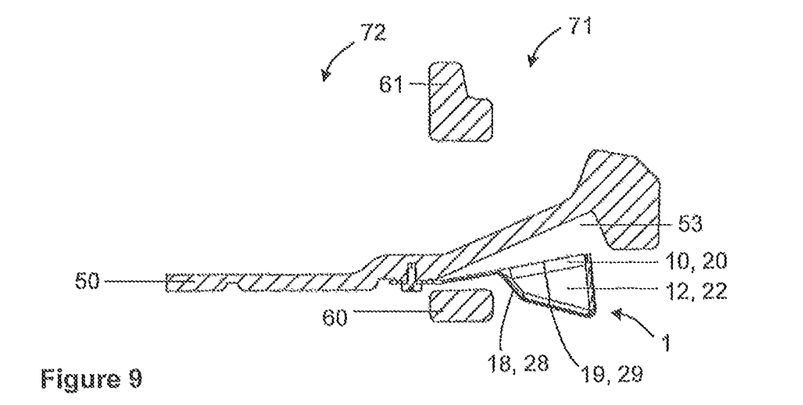
FIGS. 9 to 11 are cross-sections through a tray unit comprising the latch in three stages of closing.
Figure 10:
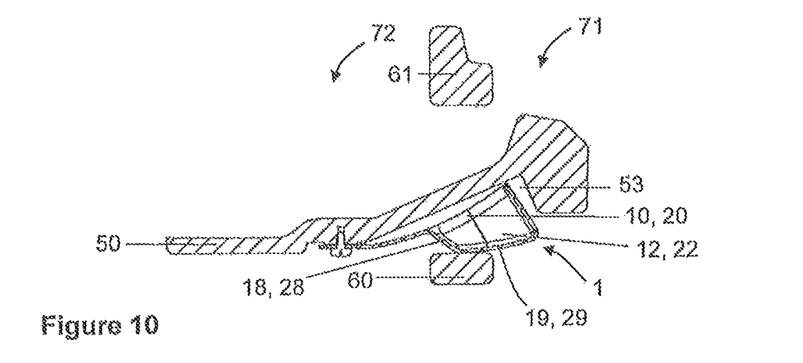
Figure 11:
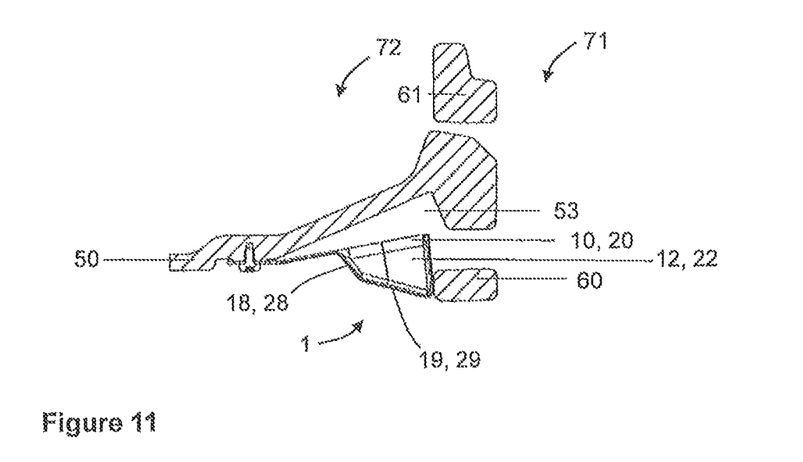

FIGS. 9 to 11 each show cross-sections through an assembly comprising a tray unit 50 and a latch 1 in stages of closing by a user. The assembly comprises part of an animal house.

The part of the animal house shown is a rear wall having an aperture. The aperture is shown as bounded at a top edge by a top wall 61 and at a lower edge by a bottom wall 61.

Each assembly therefore comprises a tray unit 50, a latch 1, and a rear wall of an animal house.

The base wall 60 and top wall 61 define an outer side 71 and an inner side 72. The outer side and inner side may further be separated by walls (not shown), extending from the base wall 60 and the top wall 61. The inner side 72 may, for example, be the inside of a hen-house.

Opening the Tray Unit

In the closed state (shown in FIG. 11), the tray unit 50 cannot be moved to an open state without simultaneous movement by a user of both arms 10, 20 of the latch towards the tray unit 50, into the groove 53 of the tray unit. If only one of the arms 10, 20 is moved towards the tray unit 50, the tray unit 50 is restricted from moving to an open state by the other respective arm 10, 20 of the latch 1 due to impact with the base wall 60. In particular, the tab 12, 22 of the unactuated arm 10, 20 abuts the base wall 60

Closing the Tray Unit

In FIG. 9, the tray unit 50 is in an open state. In the open state, the tabs 12, 22 of the latch, are on the outer side 71 of the base wall 60.

In order to move the tray unit 50 into a closed state, either the tray unit 50 is pushed towards the inner side 72 of the assembly, or the latch 1 is moved closer to the tray unit 50, into the groove 53, and the tray unit 50 is then slid towards the inner side 72 of the assembly. If the tray unit 50 is just pushed towards the inner side 72 without active movement by a user of the latch 1, the latch will be forced towards the tray unit 50, into the groove 53, by the base wall 60. Each first sloped section 18, 28 and second sloped section 19, 29 of the tabs 12, 22 facilitates easy movement of the tray unit 50 towards the inner side 72, without the need for a user to lift the tray unit 50.

FIG. 10 shows a partially closed state of the assembly. In FIG. 10, each second sloped section 19, 29 of each tab 12, 22, is resting on the base wall 60, and the groove 53 of the tray unit 50 is resting on the latch 1.

FIG. 11 shows a closed state of the assembly. In FIG. 11, the latch 1 is in a rest condition, and each free end 13, 23 of each arm 10, 20, is away from the groove 53 of the tray unit 50. In this closed state of the assembly, the tabs 12, 22 of the latch 1 are located to an inner side 72 of the base wall 60.

Figure 12:
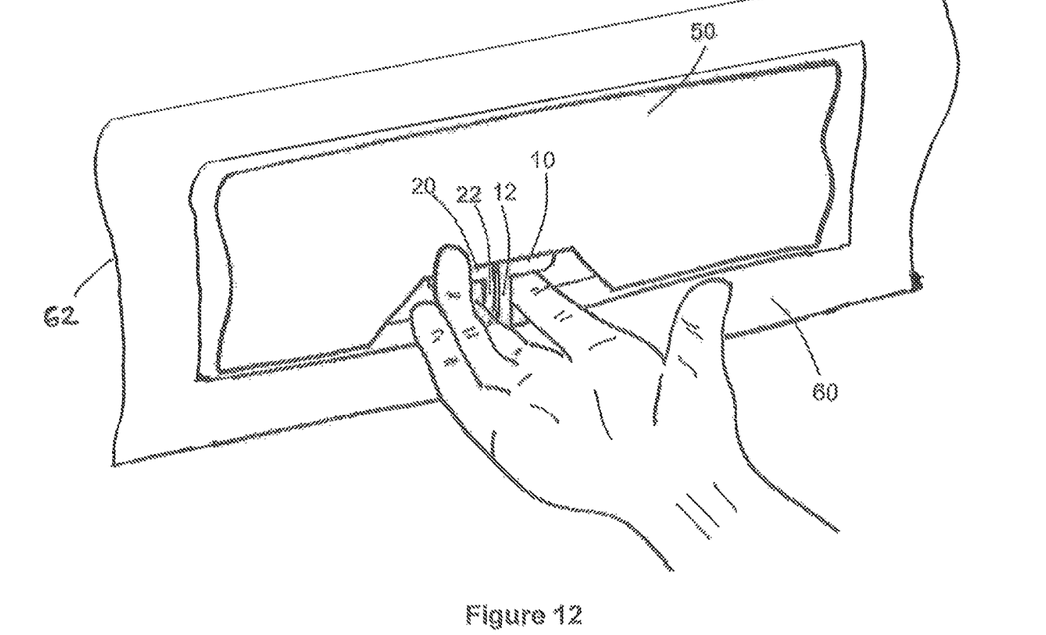
FIG. 12 is an illustration of the latch of the first aspect of the disclosure being opened by a human.
Figure 13:
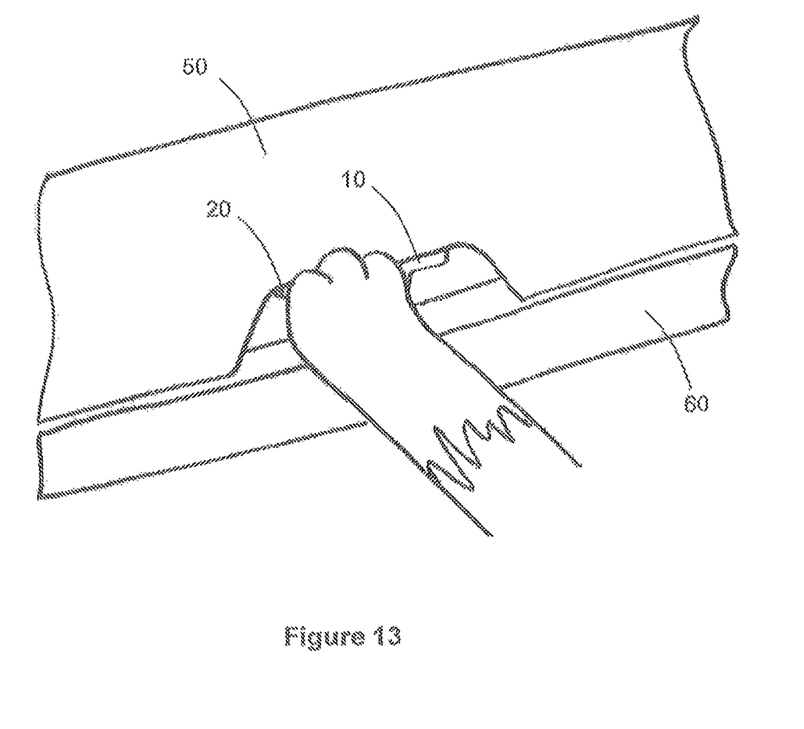
FIG. 13 is an illustration of the latch of the first aspect of the disclosure not being opened by an animal such as a fox.

This restriction has practical consequences for a predator such as a fox, and is demonstrated by FIGS. 12 and 13.

FIG. 12 shows how a human is able to insert an index finger and a middle finger to either side of the tabs 12, 22 of the latch 1 and move both arms 10, 20 of the latch towards the tray unit 50. The human is able to move the tray unit 50 away from a panel 62 to an open state by doing this.

In FIG. 13, an animal, such as a fox, is shown as not being able to move both arms 10, 20 of the latch 1, and consequently the animal is not able to move the tray unit 50 to an open state.

It will also be appreciated that whilst various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims.

It should also be noted that while the accompanying claims set out particular combinations of features described herein, the scope of the present disclosure is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 Sec. 112, par. 6.

The invention claimed is:

1. A latch for an animal house, the latch comprising;
   a body;
   a first arm extending from the body; and
   a second arm extending from the body;
   wherein the first arm and the second arm are each independently able to flex with respect to the body, the first arm and the second arm each extending along a longitudinal axis of the latch from a fixed end proximate to the body to a free end distal to the body,
   wherein the first arm and the second arm each define (i) an outer side and (ii) an inner side that is positioned between the outer side and the longitudinal axis;

wherein a wall is provided on the first and/or second arm toward the free end thereof and on the inner side thereof, the wall dividing the first and second arms, and wherein the latch comprises a restoring resilient bias, the restoring resilient bias being configured to restore the latch to a rest condition in which the first and second arms are substantially aligned with each other.

2. A latch according to claim 1, wherein the restoring resilient bias is a flat spring, defined by the body and the first arm, and defined between the body and the second arm.

3. A latch according to claim 1, wherein the first and second arms extend so as to define a slot therebetween.

4. A latch according to claim 1, wherein the wall of the first arm and/or the second arm defines a tab.

5. A latch according to claim 1, wherein each of the first and the second arms comprises a respective wall.

6. A latch according to claim 4, wherein the tab or tabs are located at the free end.

7. A latch according to claim 5, wherein the first and second arms extend in a first plane, and the tabs extend in a second plane, and the first plane is generally orthogonal to the second plane.

8. A latch according to claim 4, wherein each tab is substantially wedge-shaped, such that it has a wide end and a narrow end, the wide end being proximate the free end of the latch.

9. A latch according to claim 4, wherein each tab has a first sloped section proximate the narrow end, a second sloped section proximate the wide end, the first sloped section having a steeper gradient relative to the arm than the second sloped section.

10. A latch according to claim 4, wherein the tab and/or tabs each have a tab rim, the rim of each tab extending towards the other respective tab.

11. A latch according to claim 9, wherein the tabs are located apart by a distance D, the distance D being larger than the width W of the slot, the rims of the tabs being a distance apart R, the distance R being the same as the width W of the slot.

12. A latch according to claim 1, wherein the latch comprises polymeric material.

13. A latch according to claim 1, wherein the latch has a plurality of rounded corners.

14. A tray unit comprising a latch according to claim 1.

15. An animal house comprising a latch according to claim 1, wherein the animal house comprises:
a panel,
the panel defining an aperture bounded at an edge thereof by a first portion of the panel,
wherein the latch is arranged relative to the panel such that the first and the second arms are aligned with the aperture and the wall or walls of the latch extend at least partially across the aperture and the first portion of the panel.

16. An animal house according to claim 15, further comprising a tray unit, wherein the latch is attached to the tray unit at the fixed ends defined by the first arm and the second arm, the tray unit being aligned with the aperture.

17. An animal house according to claim 16, wherein the tray unit defines a groove, the groove being configured to receive the latch when the latch is flexed towards the tray unit.

18. An animal house according to claim 17, wherein a dimension defined by the tray unit and the latch, when the latch is in a rest condition, is larger than a dimension defined by the aperture of the animal house.

19. An animal house according to claim 18, wherein the latch and the tray unit are configured such that when the flexible arms of the latch are both flexed towards the tray unit, a dimension defined by the latch and the tray unit is smaller than a dimension defined by the aperture of the animal house.

20. An animal house comprising:
a latch
a tray unit;
a panel,
the latch comprising a body; first and second arms extending substantially in parallel from the body; wherein the first arm and the second arm are each independently able to flex with respect to the body, the first arm and the second arm each define a fixed end proximate to the body, and a free end distal to the body; and wherein the latch further comprises a restoring resilient bias, the restoring resilient bias being configured to restore the latch to a rest condition in which the first and second arms are substantially aligned with each other, said latch being attached to the tray unit at the fixed ends defined by the first arm and the second arm,
the panel defining an aperture bounded at an edge thereof by a first portion of the panel, wherein the tray unit is aligned with the aperture and the latch is arranged relative to the panel such that the first and the second arms are aligned with the aperture.

* * * * *